(12) United States Patent
Ganahl

(10) Patent No.: US 12,484,732 B2
(45) Date of Patent: Dec. 2, 2025

(54) FOOD WARMING SYSTEM

(71) Applicant: Joe Ganahl, Honolulu, HI (US)

(72) Inventor: Joe Ganahl, Honolulu, HI (US)

( * ) Notice: Subject to any disclaimer, the term of this patent is extended or adjusted under 35 U.S.C. 154(b) by 0 days.

(21) Appl. No.: 18/375,898

(22) Filed: Oct. 2, 2023

(65) Prior Publication Data
US 2024/0032728 A1  Feb. 1, 2024

Related U.S. Application Data

(63) Continuation-in-part of application No. 17/838,138, filed on Jun. 10, 2022, which is a continuation of application No. 17/536,049, filed on Nov. 28, 2021, which is a continuation-in-part of application No. 16/459,795, filed on Jul. 2, 2019, now abandoned.

(60) Provisional application No. 62/694,981, filed on Jul. 7, 2018.

(51) Int. Cl.
*A47J 36/24* (2006.01)
*A23B 2/53* (2025.01)
*A23L 3/28* (2006.01)
*A47J 36/02* (2006.01)
*A47J 36/10* (2006.01)
*A47J 36/38* (2006.01)
*A47J 47/14* (2006.01)

(52) U.S. Cl.
CPC ............. *A47J 36/2483* (2013.01); *A23B 2/53* (2025.01); *A47J 36/025* (2013.01); *A47J 36/10* (2013.01); *A47J 36/38* (2013.01); *A47J 47/14* (2013.01)

(58) Field of Classification Search
CPC .. A47J 36/38; A47J 36/10; A47J 47/14; A47J 36/2483; A47J 36/025; A23L 3/28
See application file for complete search history.

(56) References Cited

U.S. PATENT DOCUMENTS

| | | | |
|---|---|---|---|
| 6,541,738 B1 * | 4/2003 | Casasola | A45C 11/20 |
| | | | 219/428 |
| 9,581,972 B1 * | 2/2017 | Arrow | G04G 21/00 |
| 2010/0103022 A1 * | 4/2010 | Stefani | G08G 5/26 |
| | | | 342/30 |
| 2011/0143000 A1 * | 6/2011 | Fiset | C12H 1/165 |
| | | | 426/248 |
| 2013/0047701 A1 * | 2/2013 | Peltz | G01V 11/00 |
| | | | 73/23.2 |
| 2015/0136769 A1 * | 5/2015 | Quinn | A47J 36/10 |
| | | | 220/240 |

(Continued)

FOREIGN PATENT DOCUMENTS

WO   WO-2017205431 A1 * 11/2017

*Primary Examiner* — Edward F Landrum
*Assistant Examiner* — Kuangyue Chen
(74) *Attorney, Agent, or Firm* — Edmond DeFrank

(57) ABSTRACT

The embodiments disclose an apparatus including a food warming system device including an integrated heat tray insert and a food container, wherein the integrated heat tray insert is configured to include a control printed circuit board assembly coupled to a rechargeable battery pack, a plurality of heat dispersing elements coupled to the control printed circuit board assembly and is used to warm food placed in the heat tray insert, and wherein the control printed circuit board assembly is configured to include at least one cellular connectivity device and transceiver for transmitting food status information to a user and receiving user instructions from a user digital device using a food warming system application.

12 Claims, 17 Drawing Sheets

(56) References Cited

U.S. PATENT DOCUMENTS

2018/0255965 A1\* 9/2018 Bauer ..................... A47J 37/01

\* cited by examiner

FOOD WARMING SYSTEM

CROSS-REFERENCE TO RELATED APPLICATIONS

This patent Application is a Continuation-In Part and claims priority to the United States Patent Application entitled: "FOOD WARMING SYSTEM", U.S. Ser. No. 17/838,138 filed on Jun. 10, 2022, by Joseph Ganahl, which is a Continuation of the United States Patent Application entitled: "FOOD WARMING SYSTEM", U.S. Ser. No. 17/536,049 filed on Nov. 28, 2021, by Joseph Ganahl, which is a Continuation-in-part of United States Patent Application entitled: "FOOD WARMING SYSTEM," U.S. Ser. No. 16/459,795 filed on Jul. 2, 2019, by Joseph Ganahl, which is based on U.S. Provisional Patent Application Ser. No. 62/694,981 filed Jul. 7, 2018, entitled "FOOD WARMING SYSTEM", by Joseph Ganahl.

BACKGROUND

Food spoilage is a naturally occurring process. When food is subjected to temperatures in the "danger zone" above 40° F. and below 140° F. the toxins multiply at an exponential rate. The toxins in turn leave bacteria on your food. Bacteria, yeasts, and molds are common causes of spoilage and food poisoning. Chilling food helps delay the food poisoning and spoiling process because the toxins grow at a slower rate, thus leaving less bacteria, and keeping food safe to eat for a longer period of time. Many portable containers are available to keep food chilled for a period of time. One impact of chilling food is that it can impact sensory details such as texture, taste, and smell. Human beings evolved to prefer hot food. Warmth enhances flavor on the sensory papillae of our tongues and heating food boosts its energy value.

DETAILED DESCRIPTION OF THE INVENTION

In a following description, reference is made to the accompanying drawings, which form a part hereof, and which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a food warming system are described for illustrative purposes and the underlying system can apply to any number and multiple types of foods. In one embodiment of the present invention, the food warming system can be configured using a PCBA with electronic and digital devices. The food warming system can be configured to include real-time temperature monitoring and can be configured to include rechargeable batteries using the present invention.

Figure 1:
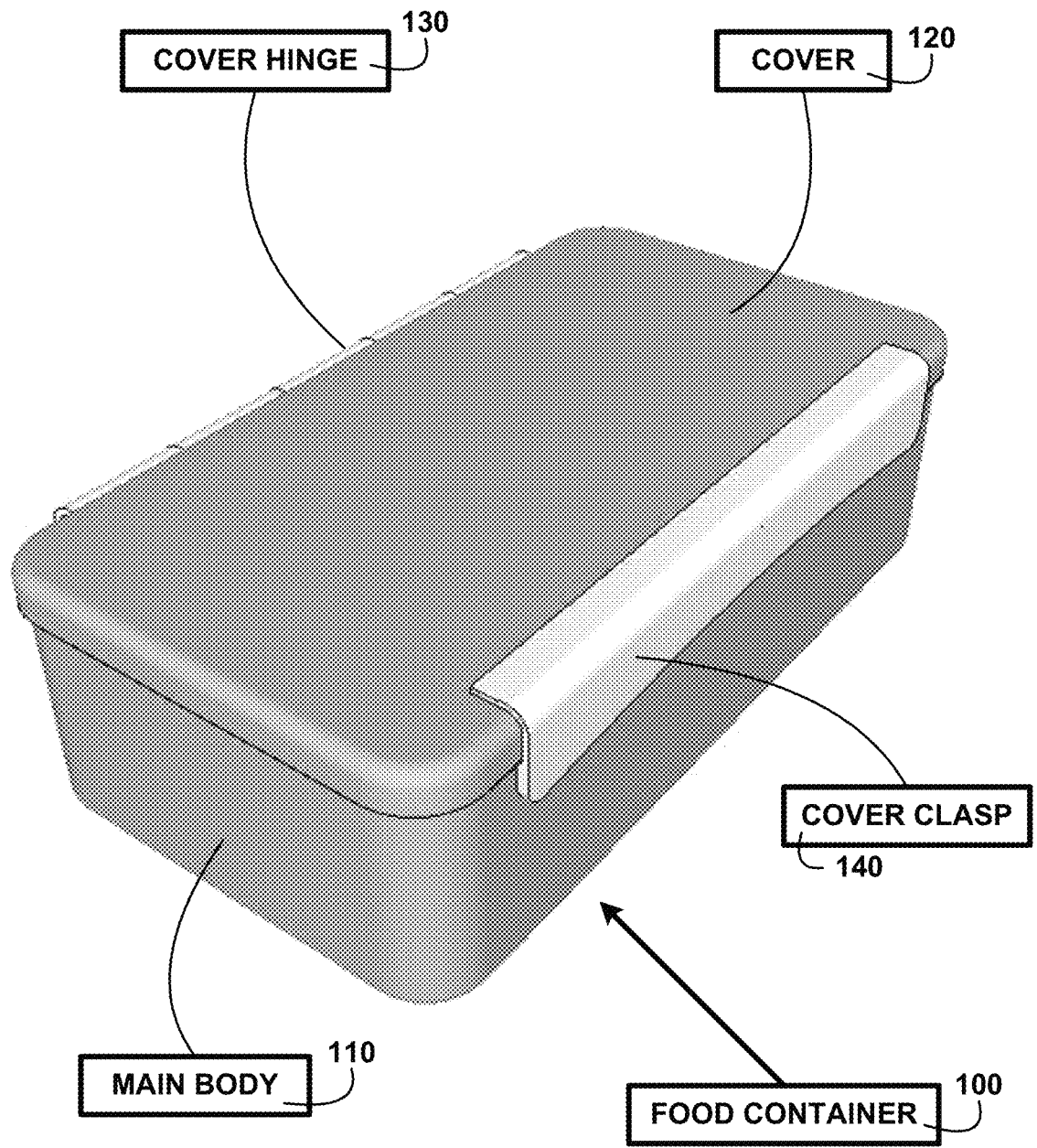
FIG. 1 shows for illustrative purposes only an example of an overview of a food warming system container of one embodiment.

FIG. 1 shows for illustrative purposes only an example of an overview of a food warming system container of one embodiment. FIG. 1 shows a food warming system food container 100 in a closed position including a main body 110 and cover 120 to prevent outside contamination while in operation of warming food. The cover 120 includes a cover hinge 130 coupled to the main body 110 for opening and closing the food container 100 and a cover clasp 140 to securely seal the food container when closed in the locked position of one embodiment.

The food warming system is a portable container for storing chilled food with an integral heating system to warm the food when ready to eat. The food container 100 is the main container designed for food storage. The food container 100 has a main body 110 which is a concave cavity where food is stored. A cover 120 seals the main body 110 closed to prevent food from escaping. The cover 120 may be hinged and secured with a single clasp or completely removable and sealed with 4 clasps, one on each side or other closure and seal systems. A heat tray insert is integrated inside the main body and contains all the elements for heating food. A rechargeable battery pack provides power to operate the system of one embodiment.

The rechargeable battery pack is directly connected to a control printed circuit board assembly (PCBA) which controls power flow, temperature, charging, and all battery safety protocols. A power button is also connected to the PCBA and is used to activate the system. When the system is activated, electrical power flows through the PCBA and is converted to heat which is then distributed along the heat tray insert foil tape or other conductors that surrounds the food. A series of LED indicators are also connected to the PCBA and show the power level of the rechargeable battery pack. Charging the rechargeable battery pack is accomplished via a battery charge port. When not in use the battery charge port is sealed with a waterproof cover to prevent moisture leakage into the battery charge port. The waterproof cover is removed for charging and a charger plug is inserted into the battery charge port of one embodiment.

The food warming system food container forms a self-contained, lightweight, compact, battery-powered, food-safe, waterproof compartment with surrounding heat elements, adaptable to virtually any food container type. The food warming system container may be fabricated using stainless steel interior insulated walls with exterior plastic jacketing. The exterior plastic jacketing may be fabricated using plastic injection, co-molded silicone injection, or Surface Mount (SMT) assembly providing low-cost and scalable manufacturing systems of one embodiment.

DETAILED DESCRIPTION

Figure 2:
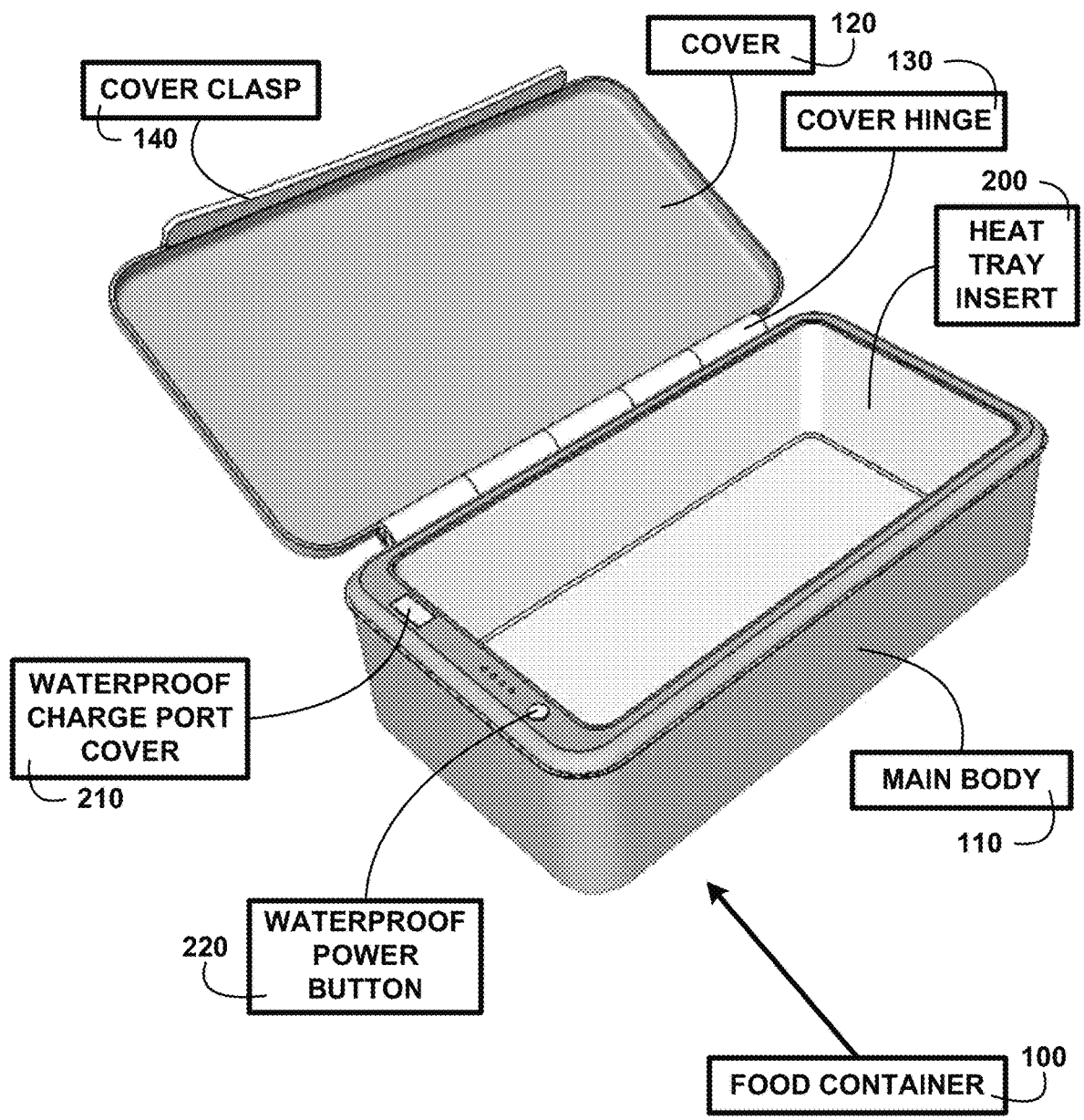
FIG. 2 shows for illustrative purposes only an example of a waterproof power button of one embodiment.

FIG. 2 shows for illustrative purposes only an example of a waterproof power button of one embodiment. FIG. 2 shows the food container 100, main body 110, cover 120 in an opened position, cover hinge 130, and the cover clasp 140 unlocked. A heat tray insert 200 is shown integrated into the food container 100. A waterproof charge port cover 210 is shown with a waterproof cover installed. A waterproof power button 220 is used to activate and deactivate the heating and control systems. The waterproof power button 220 prevents moisture from entering the power circuits and creating a short of one embodiment.

The food warming system devices are configured to be easily portable so that food can be warmed anywhere. The food warming system devices are self-contained, food safe, and waterproof so that liquidous foods will not damage the system. Power is supplied by a customized rechargeable battery pack. Heating power, charging, and battery safety circuits are all contained in the PCBA. When the system is activated the PCBA will convert electrical energy to heat energy and disperse it through conductors including for example foil tape conductors or other conductors of one embodiment.

These conductors are placed along the walls and bottom of the heat tray insert 200 and, in some embodiments, along the cover inside the surface. The heat elements completely surround the food and transfer heat into the food for warming. The food warming system heating systems are attached to a stainless-steel shell and heat is transmitted through the shell directly to the food which is placed within the stainless-steel shell by generating heat in the food container using the electrical impedance of a plurality of heat-dispersing elements one embodiment.

The food warming system devices may be configured in shapes and sizes for various food types and natures, for example, round, oblong, or other shapes and sizes. For example, one shape and size for a typical sandwich with square-shaped bread slices, in another example where the interior space is compartmentalized to separate for example soups from dry foods.

In other embodiments the food warming system devices may be configured for specific user activities for example travel in a commercial airlines where the rechargeable battery pack is of a type and design that meets TSA regulations, the food container seals when closed prevent any leakage, and the cover clasp 140 is configured to be child-proof and cannot be accidentally opened by contact with other objects.

In yet other embodiments the food warming system devices may be configured for keeping foods placed inside cold for example ice creams, fresh fruit, and salads to prevent wilting and maintaining the food below 40° F. to prevent bacterial growth until the user is ready to warm the food if desired.

Figure 3:
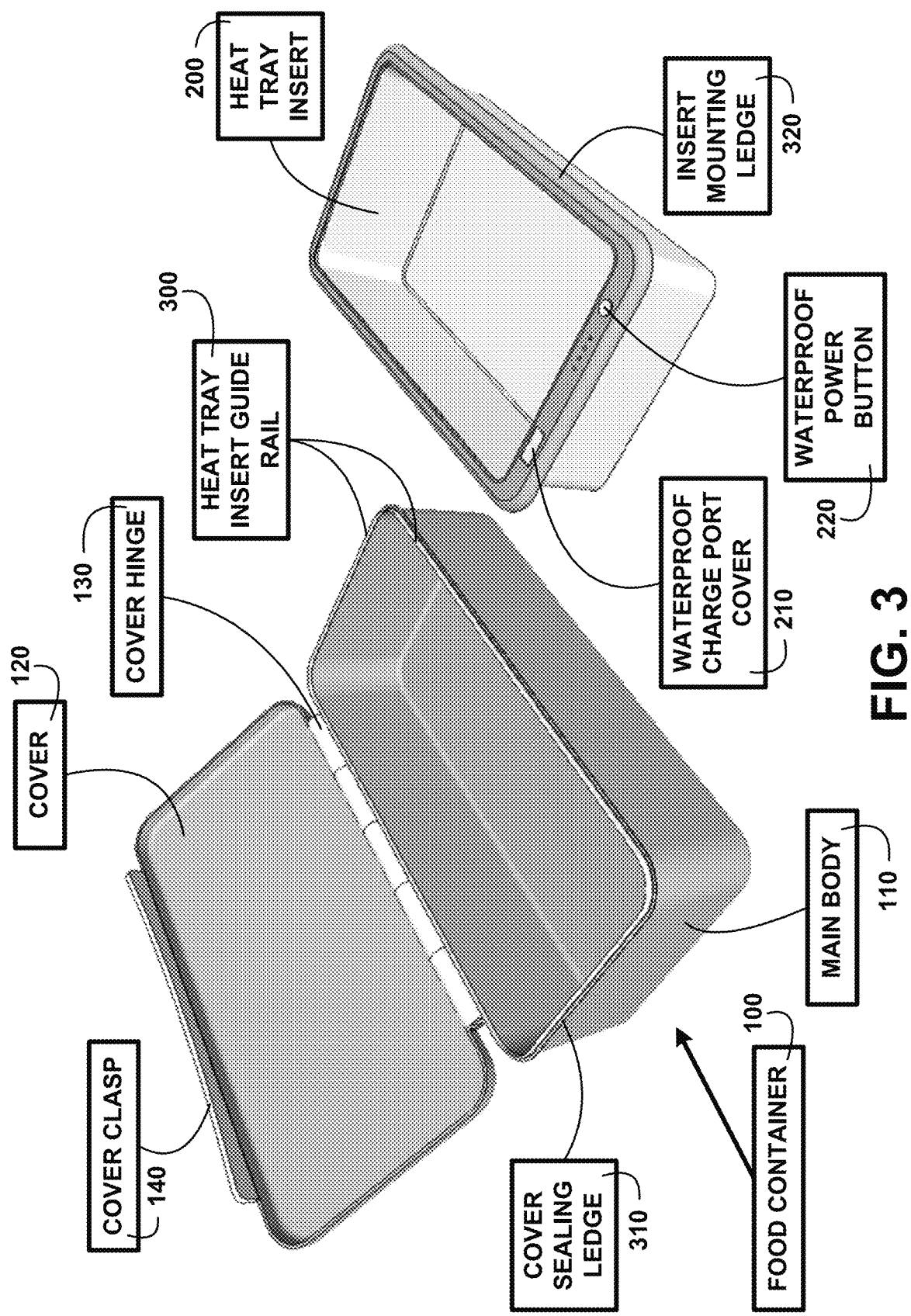
FIG. 3 shows for illustrative purposes only an example of a heat tray insert of one embodiment.

A Heat Tray Insert:

FIG. 3 shows for illustrative purposes only an example of a heat tray insert of one embodiment. FIG. 3 shows the food container 100, main body 110, cover 120 in an opened position, cover hinge 130, unlocked cover clasp 140 with the integral heat tray insert 200 removed and set alongside. The waterproof charge port cover 210 and waterproof power button 220 can be seen on one side of a heat tray insert mounting ledge 320. The heat tray insert guide rail 300 is configured to provide a cover sealing ledge 310 of one embodiment.

Figure 4:
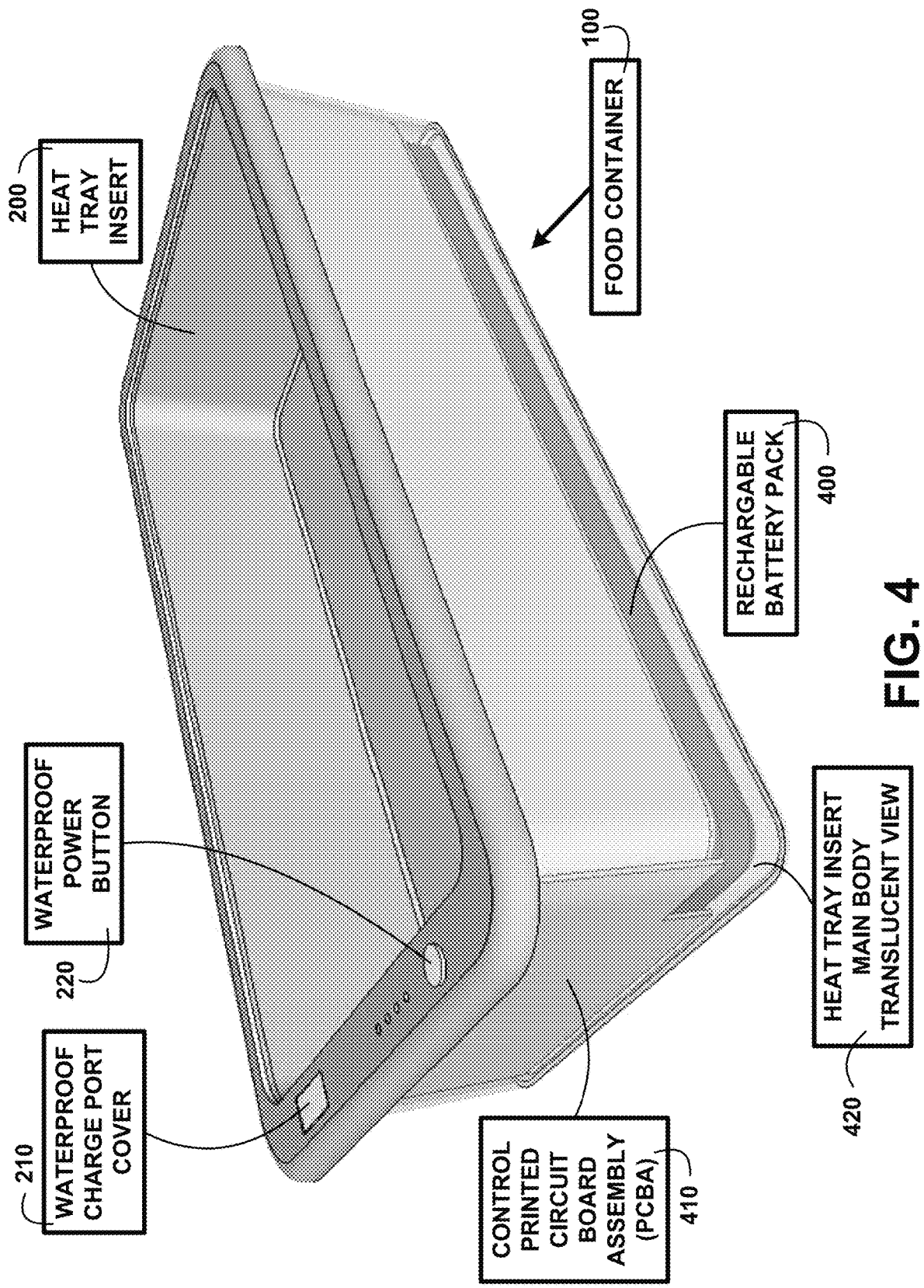
FIG. 4 shows for illustrative purposes only an example of a control printed circuit board assembly (PCBA) of one embodiment.

A Control Printed Circuit Board Assembly (PCBA):

FIG. 4 shows for illustrative purposes only an example of a control printed circuit board assembly (PCBA) of one embodiment. FIG. 4 shows the food container 100 heat tray insert 200 with a heat tray insert main body translucent view 420 of exterior wall surfaces for illustrative purposes only. Also seen are the waterproof charge port cover 210 and waterproof power button 220. Showing underneath, the heat tray insert 200 inner surface is a rechargeable battery pack 400. Showing inside the translucent wall is at least one control printed circuit board assembly (PCBA) 410 in this example at one end of the heat tray insert 200.

The control printed circuit board assembly (PCBA) 410 is electrically coupled to the rechargeable battery pack 400. The control printed circuit board assembly (PCBA) 410 is coupled to a battery charge level device and an infrared thermometer sensor for monitoring food temperature in real-time.

The control printed circuit board assembly (PCBA) 410 includes at least one digital processor, at least one digital memory device, at least one database; at least one infrared thermometer coupled to the PCBA, at least one chemical vapor sensing device, at least one circuit coupled to the food container 100 cover 120, at least one circuit coupled to at least one digital temperature display, at least one circuit coupled to an alert light coupled to the cover 120, and at least one circuit coupled to a temperature control selection device mounted on the heat tray insert 200 insert mounting ledge 320.

At least one chemical vapor sensing device is used to analyze odors from the food placed in the heat tray insert 200. At least one chemical vapor sensing device detects the chemical signatures of spoiled food odors, food-borne pathogens, for example, salmonella, and other food conditions that may cause a food consumer to become ill or even die. The chemical vapor sensing device coupled to the control printed circuit board assembly (PCBA) 410 performs the chemical analysis to determine the chemical formulae of the vapor elements.

At least one digital processor is used to search at least one digital memory device database for the identity of the chemical formulae from the chemical compound data prerecorded and stored in that database. Should the identified chemical formulae be categorized as a health hazard, the PCBA will transmit an alert to the user to dispose of the food and not eat the food and identify the potential health hazard detected. Embodiments may include using at least one digital memory device database for recording data on various foodstuffs including recipe ingredients, characteristics, visual examples, cooking instructions with minimum food safety temperatures, precautions, spoilage indications and signs, and other information for keeping foods safe for consumption.

In another embodiment, the identified chemical formulae are transmitted to a food warming system digital application on a user's digital device. The food warming system digital application is configured to perform an internet search for information to determine if the identified chemical formulae are categorized as a health hazard. The food warming system digital application will automatically display a visual warning and broadcast an audible alert to the user regarding the potential health hazard that has been determined.

In another embodiment, the user may enter the type of food to be placed in the food warming system into the food warming system digital application installed on the user's digital device. The food warming system digital application will perform a search and display recipe ingredients, characteristics, visual examples, cooking instructions with minimum food safety temperatures, precautions, spoilage indications and signs, and other information for keeping foods safe for consumption.

The control printed circuit board assembly (PCBA) 410 includes at least one cellular connectivity device and transceiver for transmitting food status signal alerts, battery charge alerts, and receiving user turn-off instructions. The control printed circuit board assembly (PCBA) 410 includes connectivity devices to Bluetooth and Wi-Fi to provide communication and control alternatives to the user including voice-activated commands.

A rheostat device for regulating power levels conducting battery energy to a plurality of heat dispensing elements is also controlled by the control printed circuit board assembly (PCBA) 410 of one embodiment. The rechargeable battery pack 400 provides power to operate the food warming system components. The control printed circuit board assembly (PCBA) 410 controls power flow, temperature, charging, and all battery safety protocols. The waterproof power button 220 is also coupled to the control printed circuit board assembly (PCBA) 410 and rechargeable battery pack 400 and is used to activate the system. When the system is activated, electrical power flows through PCBA and is converted to heat which is then distributed along the heat tray insert 200 conductors that surround food placed inside the heat tray insert 200. The LED indicators are also connected to PCBA and show the power levels of the rechargeable battery pack 400 of one embodiment.

Figure 5:
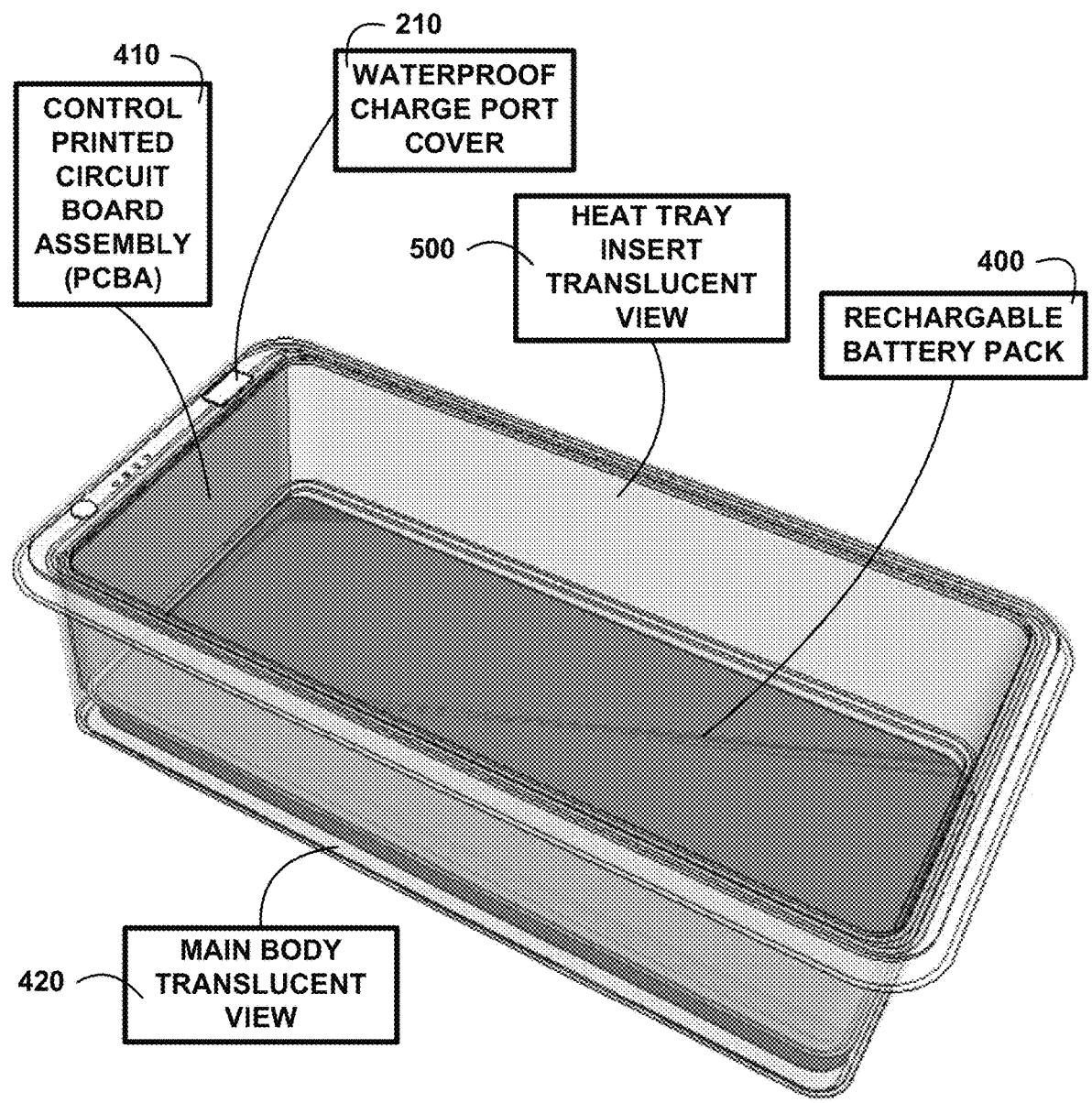
FIG. 5 shows for illustrative purposes only an example of a rechargeable battery pack of one embodiment.

A Rechargeable Battery:

FIG. 5 shows for illustrative purposes only an example of a rechargeable battery pack of one embodiment. FIG. 5 shows a heat tray insert translucent view 500 and the main body translucent view 420 for illustrative purposes only. The waterproof charge port cover 210 is seen covering the charge port not showing. The rechargeable battery pack 400 may include for example a lithium-ion rechargeable battery pack, a lithium polymer (LiPo) rechargeable battery, rechargeable aluminum-based batteries, rechargeable nickel-iron batteries, and other rechargeable battery types. The control printed circuit board assembly (PCBA) 410 may include a plurality of printed circuits configured for differing functions including electronic components and circuits for controlling the various food warming system operations as described above and in the following descriptions. The control printed circuit board assembly (PCBA) 410 includes multiple safety systems for battery charging and operation of one embodiment.

Figure 6:
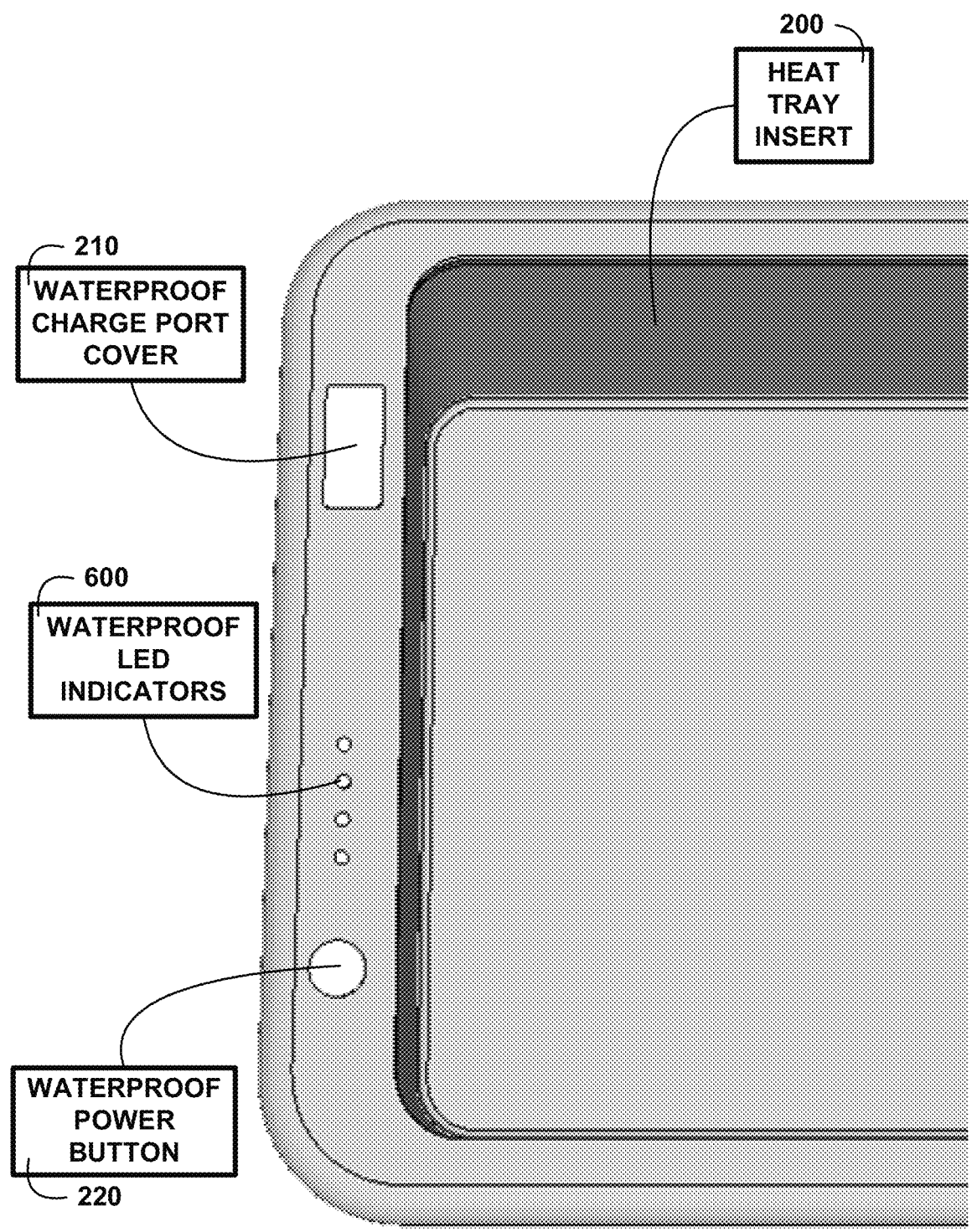
FIG. 6 shows for illustrative purposes only an example of waterproof LED indicators of one embodiment.

Waterproof LED Indicators:

FIG. 6 shows for illustrative purposes only an example of waterproof LED indicators of one embodiment. FIG. 6 shows the heat tray insert 200 with the waterproof charge port cover 210 and waterproof power button 220. Also seen are a series of waterproof LED indicators 600. The waterproof LED indicators 600 include LED lights in, for example, a series of different colors to indicate the current battery charge of the rechargeable battery pack 400 of FIG. 4. The control printed circuit board assembly (PCBA) 410 of FIG. 4 is configured to transmit battery charge alert signals to a user's digital device to make them aware of a possible action to connect the rechargeable battery pack 400 of FIG. 4 to an external power source for recharging using the charging port and a charger plug of one embodiment.

Figure 7:
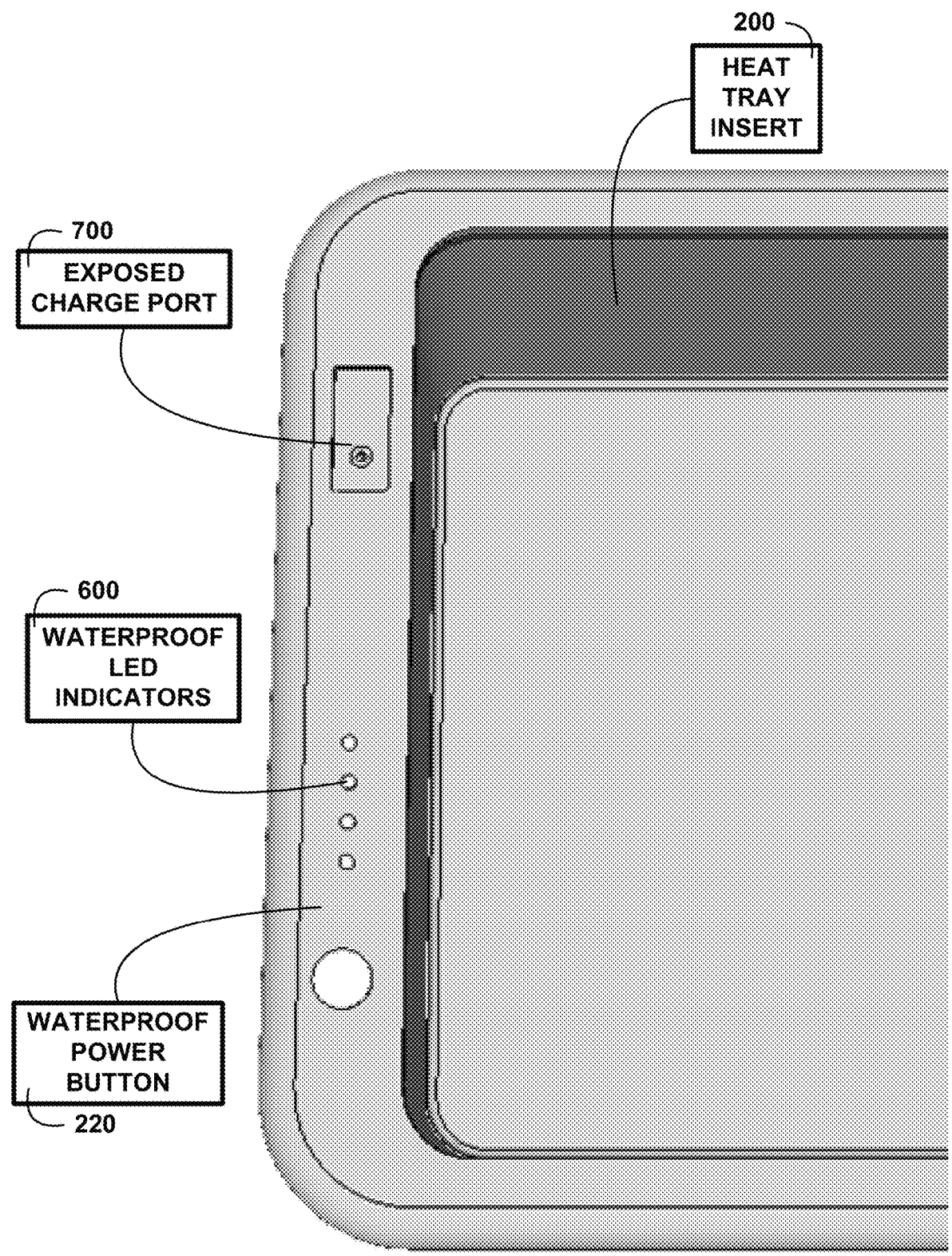
FIG. 7 shows for illustrative purposes only an example of an exposed charge port of one embodiment.

An Exposed Charge Port:

FIG. 7 shows for illustrative purposes only an example of an exposed charge port of one embodiment. FIG. 7 shows the waterproof power button 220, waterproof LED indicators 600, and heat tray insert 200 with an exposed charge port 700 wherein the waterproof charge port cover 210 of FIG. 2 has been removed. The waterproof charge port cover 210 of FIG. 2 is removed when the rechargeable battery pack 400 of FIG. 4 is being recharged using a charger plug connected to an external power source and is plugged into the exposed charge port 700 of one embodiment.

Figure 8:
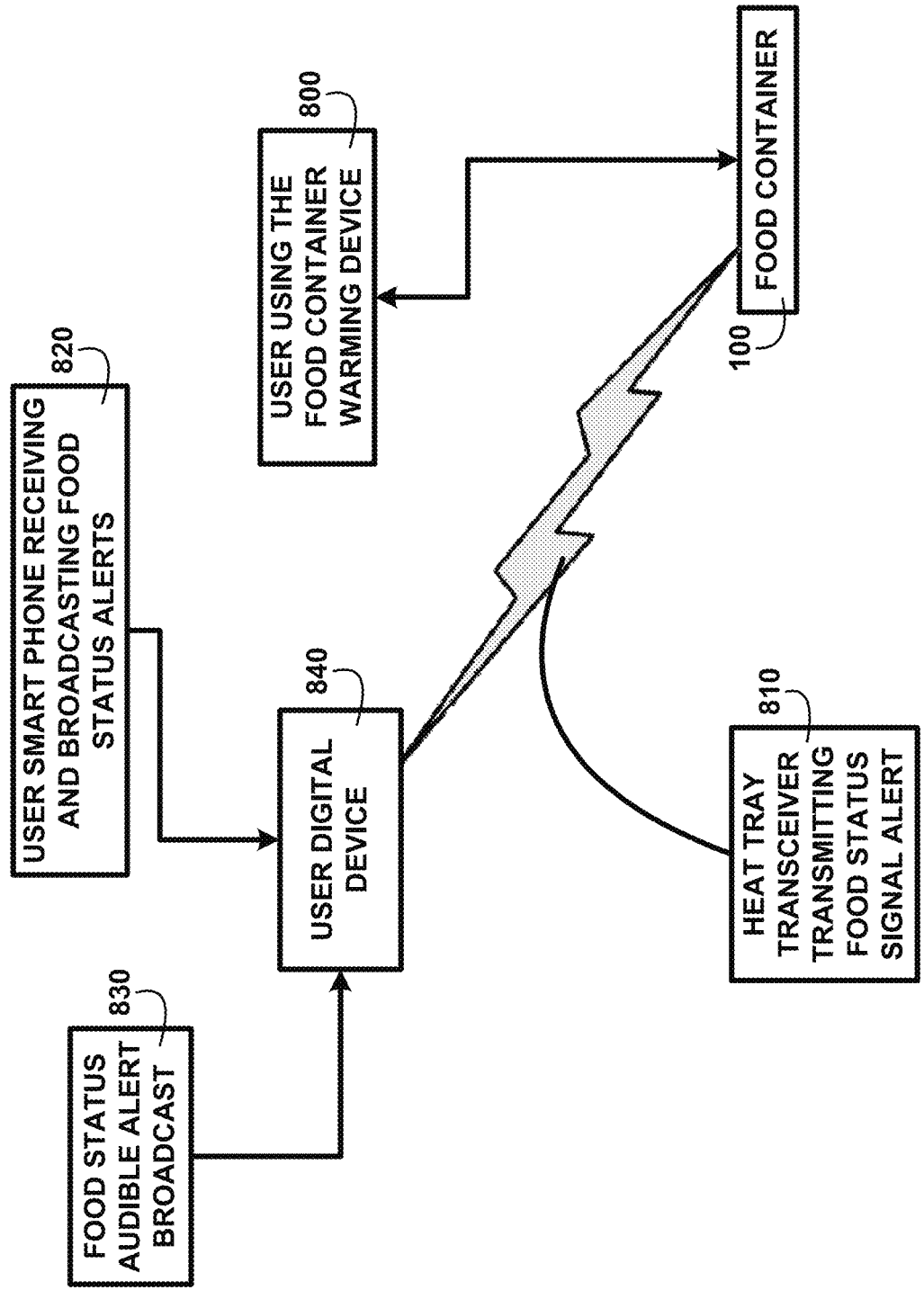
FIG. 8 shows for illustrative purposes only an example of a food status audible and visual alert broadcast of one embodiment.

A Food Status Audible and Visual Alert Broadcast:

FIG. 8 shows for illustrative purposes only an example of a food status audible and visual alert broadcast of one embodiment. FIG. 8 shows the food warming system food container 100 with the user using the food container warming device 800, for example, a family having a picnic. During the period of time the food is being heated to a safe temperature the users may be engaged in a physical activity or event. These activities may distract the family member who placed the food into the food container 100 for warming.

To alert the person that the food is ready to be served a heat tray transceiver transmitting food status signal alert 810 to the users digital device provides notice that the food is ready. In addition, the heat tray transceiver is configured to include transmitting a food status audible alert broadcast 830. The heat tray transceiver food status signal alert 810 and food status audible alert broadcast 830, using cellular connectivity, provides signals for a user digital device 840 including a user smartphone receiving and broadcasting food status alerts 820 to alert the user to attend to the food warming status.

The food warming system includes a food-warming digital application for installing on a user's digital device including, for example, a smartphone, tablet, laptop computer, and other digital devices. The food warming digital application installed on a user's digital device is configured for displaying the food status alerts on a digital screen and broadcasting audible food status alerts. The user can tap the food warming digital application icon and receive intermediate food status alerts to check the current temperature and a calculated approximate time remaining for the food to reach a safe temperature.

In one embodiment, the food warming digital application may display the temperature selection controls of the food warming food container. This allows the user to set the desired temperature using the user's digital device. The user may want to turn off or adjust the temperature which they can perform using the food warming digital application of one embodiment.

Figure 9:
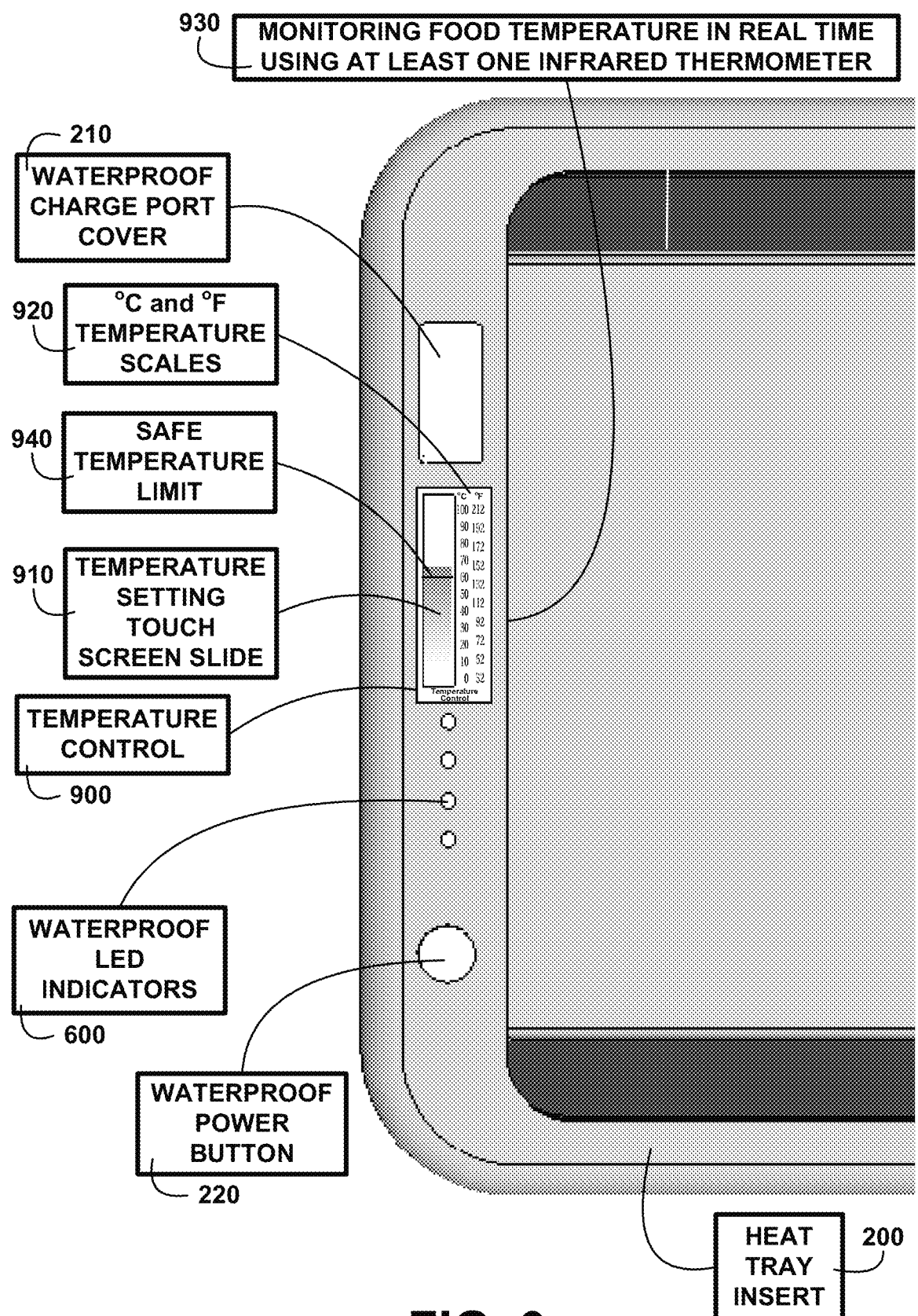
FIG. 9 shows for illustrative purposes only an example of a temperature control of one embodiment.

A Temperature Control:

FIG. 9 shows for illustrative purposes only an example of a temperature control of one embodiment. FIG. 9 shows the heat tray insert 200, the waterproof power button 220, the waterproof LED indicators 600, and the waterproof charge port cover 210. Also shown is a temperature control 900. The temperature control 900 is coupled to the control printed circuit board assembly (PCBA) 410 of FIG. 4. The temperature control 900 is configured for the user to set a temperature for warming the food placed in the food warming system.

The temperature control 900 includes a temperature setting touch screen slide 910 adjusting feature. The temperature setting touch screen slide 910 is adjustable using degrees Celsius and degrees Fahrenheit temperature scales 920. The temperature control 900 includes monitoring food temperature in real time using at least one infrared thermometer 930 that is coupled to the control printed circuit board assembly (PCBA) 410 of FIG. 4 and temperature control 900. The temperature setting touchscreen slide 910 includes a safe temperature limit 940 indicating line to remind the user not to set a temperature above that limit of one embodiment.

In another embodiment, the temperature control 900 includes digital touch buttons labeled for specific food types for example soups, sandwiches, stews, vegetables, and others. The digital touch buttons labeled for specific food types when pressed will set the targeted temperature setting to preset temperatures prerecorded in one of the at least one databases.

Figure 10:
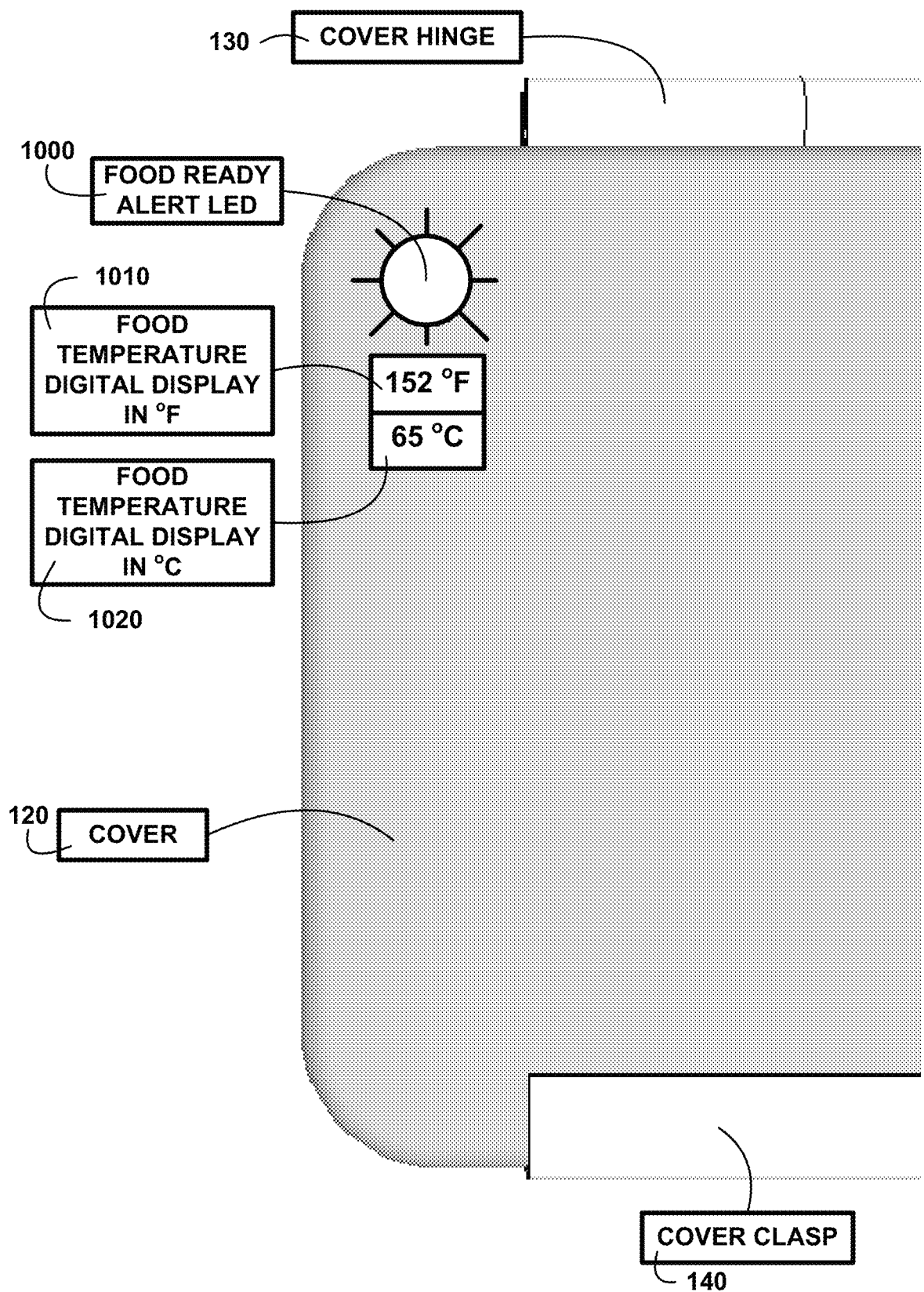
FIG. 10 shows for illustrative purposes only an example of a cover food-ready alert LED of one embodiment.

A Cover Food Ready Alert LED:

FIG. 10 shows for illustrative purposes only an example of a cover food ready alert LED of one embodiment. FIG. 10 shows the food container 100 cover 120, cover hinge 130, and cover clasp 140. In one embodiment the cover 120 includes a food ready alert LED 1000, a food temperature digital display in degrees Fahrenheit 1010, and a food temperature digital display in degrees Celsius 1020.

The food status audible alert broadcast 830 of FIG. 8 can be heard by a user with a visual impairment. The food ready alert LED 1000, food temperature digital display in degrees Fahrenheit 1010 and food temperature digital display in degrees Celsius 1020 can be seen by users with hearing impairments. In another embodiment, the temperature readings in degrees Fahrenheit and degrees Celsius may be electronic vocalizations using a text reader. This feature can be configured to broadcast the electronic vocalizations in languages selected by the user using the food-warming digital application of one embodiment.

Figure 11:
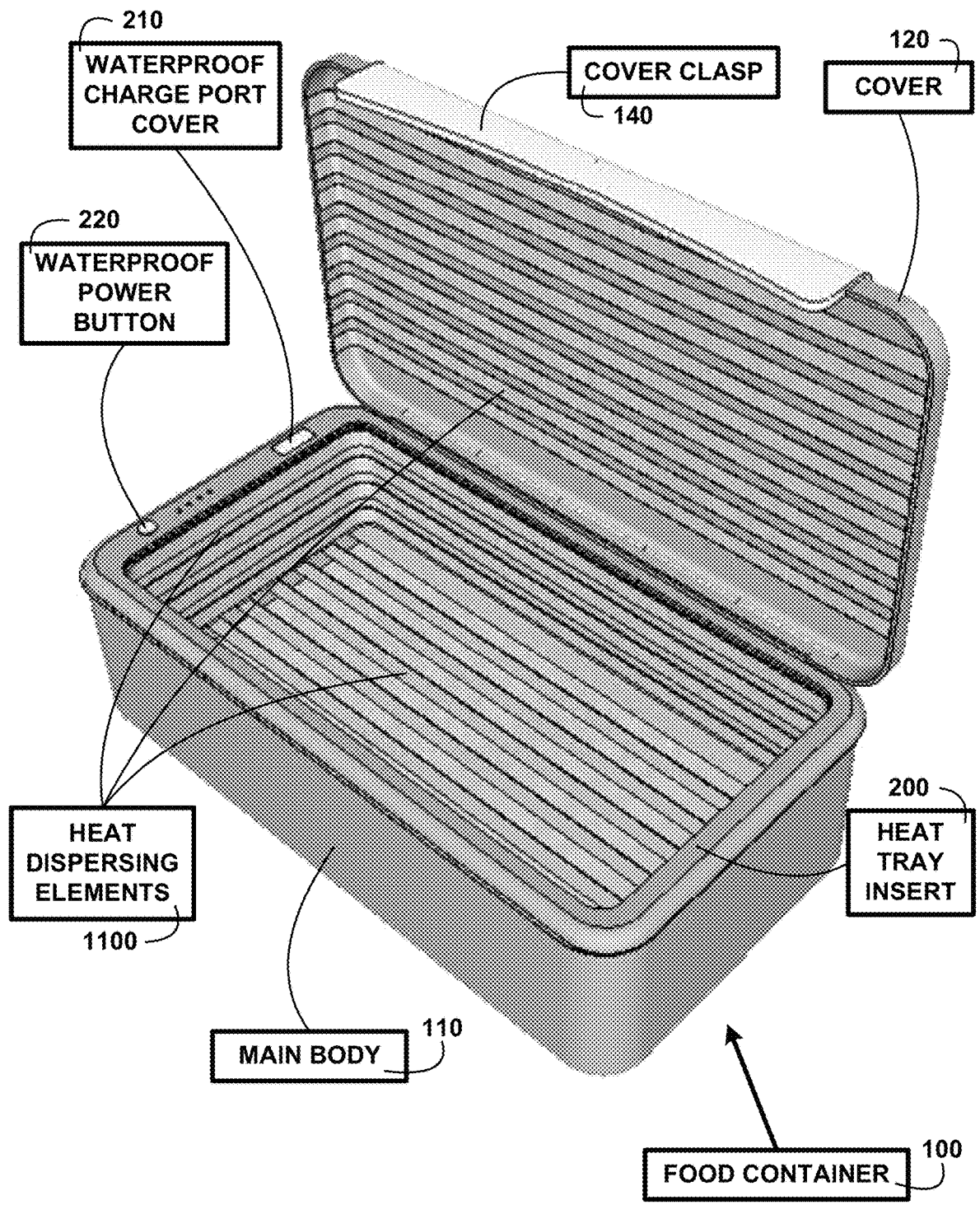
FIG. 11 shows for illustrative purposes only an example of heat-dispersing elements of one embodiment.

Heat Dispersing Elements:

FIG. 11 shows for illustrative purposes only an example of heat-dispersing elements of one embodiment. FIG. 11 shows the food container 100 including the main body 110, cover 120, cover clasp 140, heat tray insert 200, waterproof charge port cover 210, and waterproof power button 220. Also showing is a plurality of heat dispersing elements 1100 exposed for illustrative purposes only. The plurality of heat dispersing elements 1100 are heat tray insert conductors positioned to surround food placed in the food container with the heat tray insert. The interior surfaces of the food container and heat tray insert are stainless steel. The conductors are positioned directly beneath the stainless-steel interior enclosure structures and conduct heat directly through the stainless-steel material to warm the food placed against and near the interior surfaces.

When the system is activated, electrical power from the rechargeable battery pack 400 of FIG. 4 flows through at least one control printed circuit board assembly (PCBA) 410 of FIG. 4 and is converted to heat through the electrical impedance of the conductors. The control printed circuit board assembly (PCBA) 410 of FIG. 4 uses the real-time temperature monitoring of at least one infrared thermometer 930 of FIG. 9 to regulate the amperage and voltage flowing to each of the conductors. Regulating the amperage and voltage flowing to each of the conductors controls the heat produced by the electrical impedance for adjusting the heat emanating from the plurality of heat dispersing elements 1100 in the interior surface regions to provide even heating of the food.

In another embodiment, the heat tray insert 200 and food container 100 cover 120 include ultraviolet (UV) lights to treat the food placed in the heat tray insert 200 to kill bacteria, viruses, and other foodborne pathogens and sterilize the food before, during and after the warming processes.

Figure 12A:
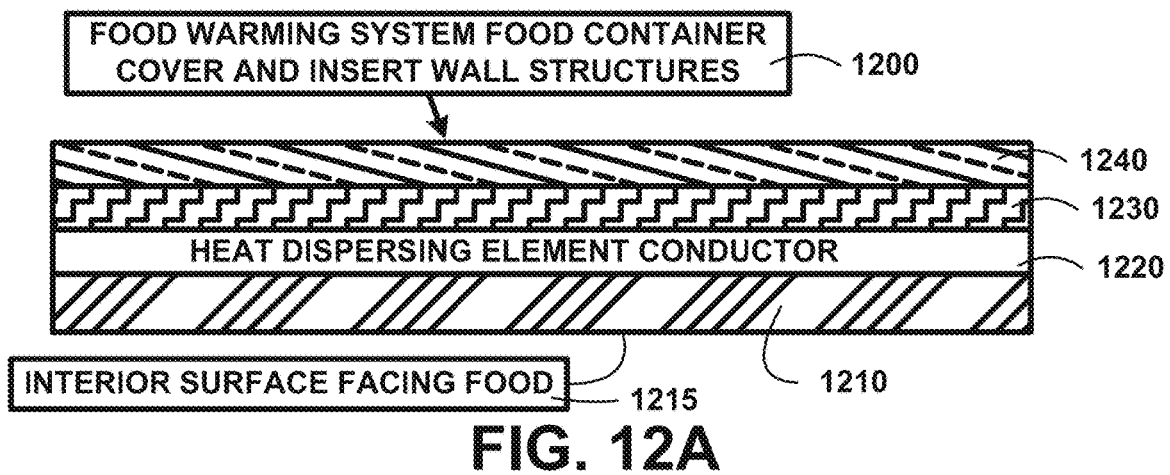
FIG. 12A shows for illustrative purposes only an example of a food warming system food container cover and insert wall structures of one embodiment.

Food Warming System Food Container Cover and Insert Wall Structures:

FIG. 12A shows for illustrative purposes only an example of a food warming system food container cover and insert wall structures of one embodiment. FIG. 12A shows the food warming system food container cover and insert wall structures 1200. The wall structures include a stainless-steel shell 1210 that provides an interior surface facing food 1215 that is placed in the food warming system. Also showing is a heat dispersing element conductor 1220 that is attached to the stainless-steel shell 1210 and coupled to at least one control printed circuit board assembly (PCBA) 410 of FIG. 4. The wall structures include an insulation 1230 layer that is surrounded by an exterior plastic jacket 1240 of one embodiment.

Figure 12B:
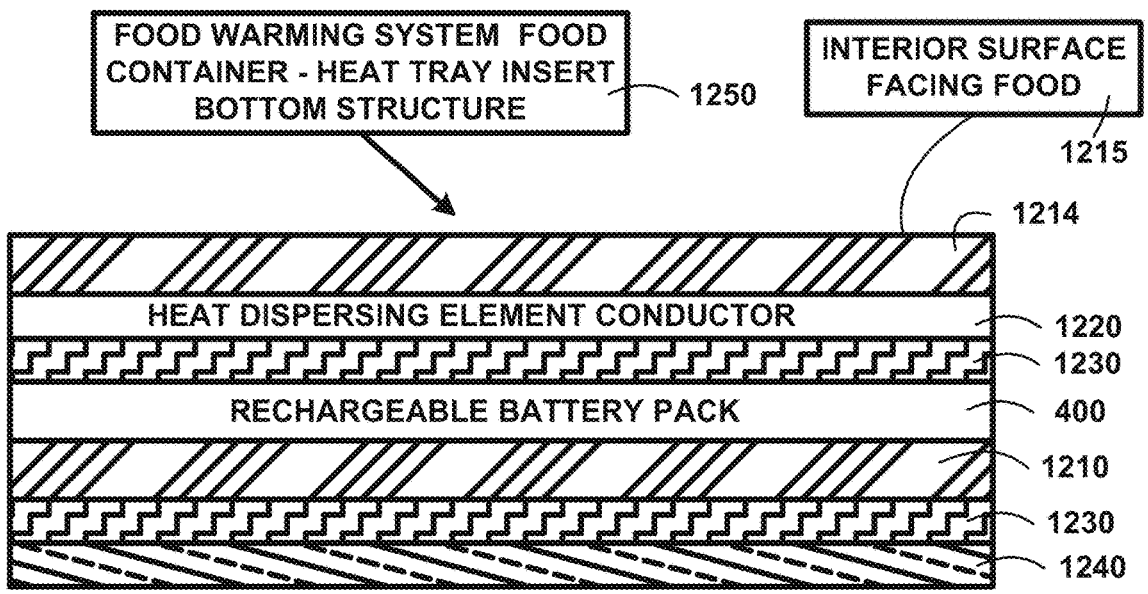
FIG. 12B shows for illustrative purposes only an example of a food warming system food container heat tray insert bottom structure of one embodiment.

A Food Warming System Food Container Heat Tray Insert Bottom Structure:

FIG. 12B shows for illustrative purposes only an example of a food warming system food container heat tray insert bottom structure of one embodiment. FIG. 12B shows a food warming system food container heat tray insert bottom structure 1250. The insert bottom structure includes an interior surface facing food 1215 of an inner stainless-steel shell 1214 with a heat-dispersing element conductor 1220 attached. An insulation 1230 layer is positioned between the heat-dispersing element conductor 1220 and the rechargeable battery pack 400. An outer stainless-steel shell 1210 provides exterior support and includes an insulation 1230 layer with an exterior plastic jacket 1240 of one embodiment.

Figure 12C:
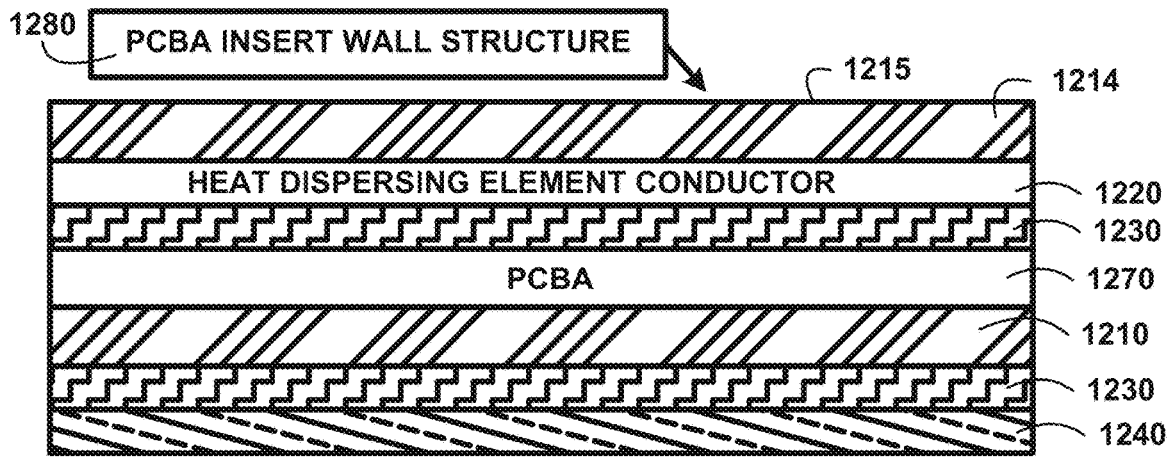
FIG. 12C shows for illustrative purposes only an example of a PCBA insert wall structure of one embodiment.

A PCBA Insert Wall Structure:

FIG. 12C shows for illustrative purposes only an example of a PCBA insert wall structure of one embodiment. FIG. 12C shows a PCBA insert wall structure 1280 showing in a horizontal orientation for illustrative purposes but is normally in a vertical orientation at one end of the food container. The PCBA insert wall structure 1280 includes an interior surface facing food 1215 of the inner stainless-steel shell 1214. A heat dispersing element conductor 1220 is shown attached to the inner stainless-steel shell 1214 for transmitting heat through the inner stainless-steel shell 1214 to warm the food placed in the food warming system food container. An insulation 1230 layer is placed between the PCBA 1270 and the heat-dispersing element conductor 1220. The outer stainless-steel shell 1210 is used for providing exterior support and for supporting the PCBA 1270 attachment. A second insulation 1230 layer is positioned between the outer stainless-steel shell 1210 and the exterior plastic jacket 1240 of one embodiment.

Figure 13A:
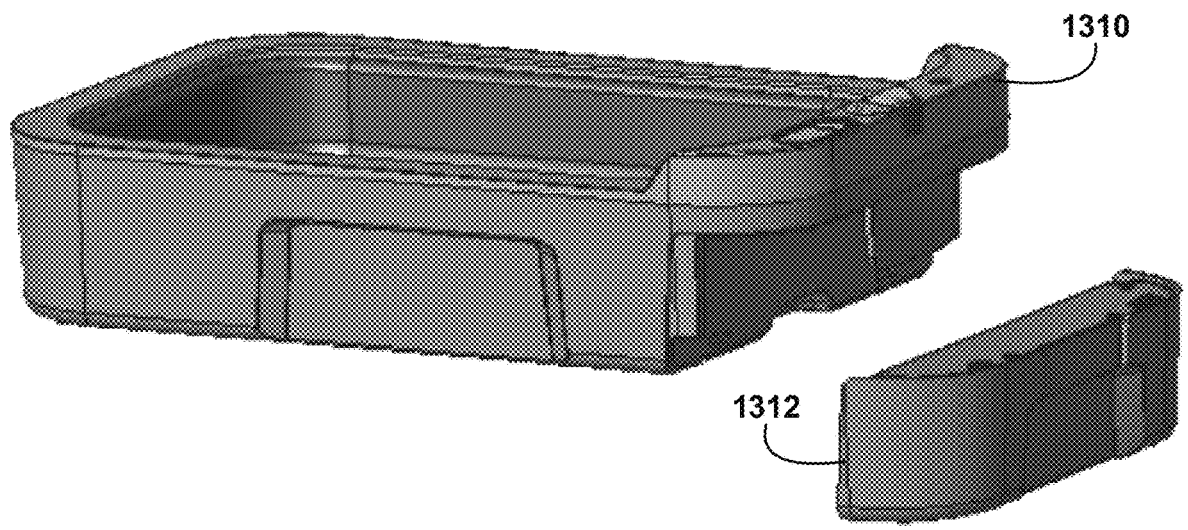
FIG. 13A shows for illustrative purposes only an example of a food warming device Base unit of one embodiment.

Food Warming Device Base Unit:

FIG. 13A shows for illustrative purposes only an example of a food warming device base unit of one embodiment. FIG. 13A shows a food warming device base unit 1310. The food-warming device is used to warm food before it is consumed. The food warming device base unit 1310 is powered with a removable battery 1312. The removable battery 1312 clips into place on the food warming device base 1310. It provides power to the device through electrical connections of one embodiment.

Figure 13B:
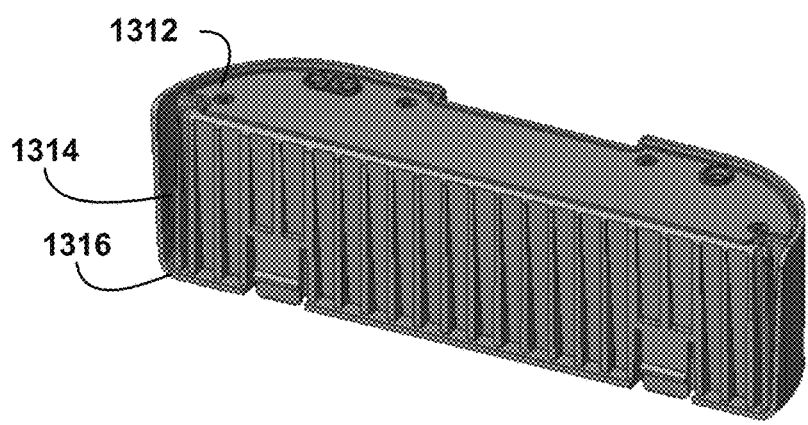
FIG. 13B shows for illustrative purposes only an example of a removable battery of one embodiment.

Removable Battery:

FIG. 13B shows for illustrative purposes only an example of a removable battery of one embodiment. FIG. 13B shows the removable battery 1312 used to power the food warming device base unit 1310 of FIG. 13A.

The removable battery 1312 is a rechargeable battery. The removable battery 1312 has high current and heat resistant capability. The removable battery 1312 system is capable of converting electrical energy from high current, heat resistant removable battery 1312 packs into food warming device base unit 1310 of FIG. 13A heat levels capable of providing food safety-in excess of 140° F. The removable battery 1312 conducts power through electrical connections to Base Unit 1314. The removable battery 1312 includes a charger port 1316 for recharging the removable battery 1312. It may be charged while removed from the base unit device using the charger port 1316 or while connected to the base unit device using the charger port 1710. One battery may be used to operate the base unit device while a second battery is charging. Or for extended use, additional batteries may be charged in advance and replaced as needed. High-capacity battery options will also be available of one embodiment.

Figure 14:
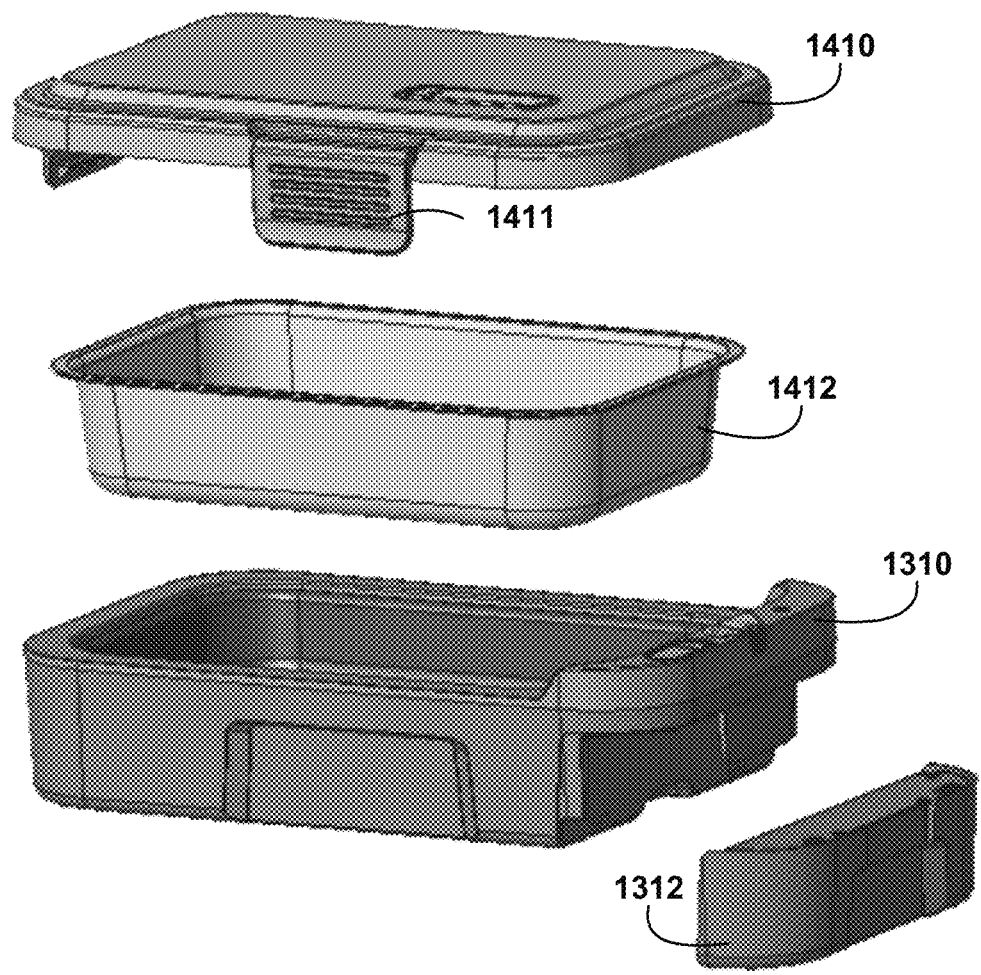
FIG. 14 shows for illustrative purposes only an example of food-warming device components of one embodiment.

Food Warming Device Components:

FIG. 14 shows for illustrative purposes only an example of food-warming device components of one embodiment. FIG. 14 shows food warming device components including the food warming device Base unit 1310. A removable nesting tray 1412 into which food is placed for warming is placed inside the food warming device Base unit 1310. An extended cover 1410 having at least one extended latch 1411 is secured on top of the food warming device Base unit 1310 to also cover the removable nesting tray 1412. The removable battery 1312 powers the food warming device Base unit 1310 heating elements to warm the food while in the covered removable nesting tray 1412.

The removable nesting tray 1412 has 30% more capacity than the food warming device Base unit 1310. It is removable for food storage or washing in a dishwasher. The extended cover 1410 incorporates longer sides and extended latches 1411 to allow for taller dimensions of the nesting tray 1412. The nesting tray 1412 drops into the base tray and is powered by the removable battery 1312. Due to the larger tray size, a high-capacity battery is available for a longer heating time of one embodiment.

Figure 15A:
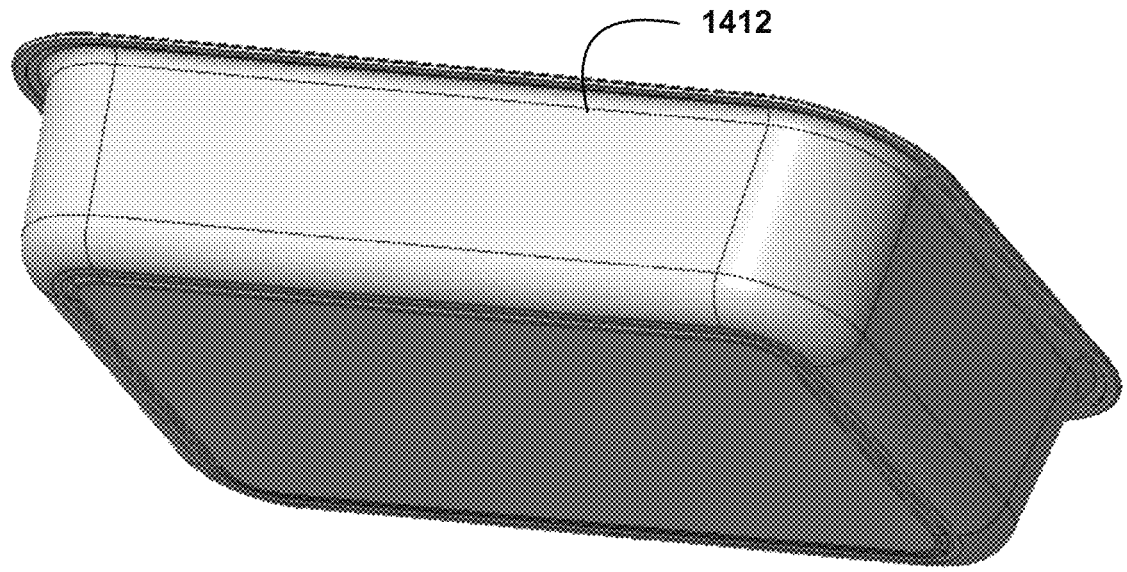
FIG. 15A shows for illustrative purposes only an example of a removable nesting tray of one embodiment.

Removable Nesting Tray:

FIG. 15A shows for illustrative purposes only an example of a removable nesting tray of one embodiment. FIG. 15A shows the removable nesting tray 1412 used to place food within to heat using the heating elements of the food warming device base unit 1310 of FIG. 13A. The nesting tray 1412 has 30% more capacity than the food warming device Base unit 1310 of FIG. 13A. The heating time varies depending on the volume of food placed in the nesting tray 1412. A high-capacity battery is available for longer heating time for larger amounts of food to be heated of one embodiment.

Figure 15B:
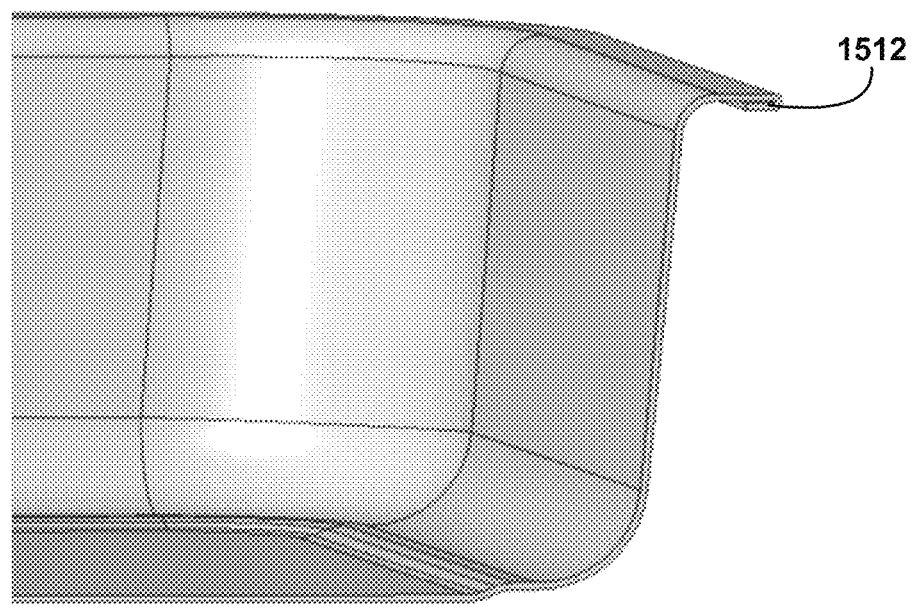
FIG. 15B shows for illustrative purposes only an example of a rolled lip extension of one embodiment.

Rolled Lip Extension:

FIG. 15B shows for illustrative purposes only an example of a rolled lip extension of one embodiment. FIG. 15B shows a rolled lip extension 1512 of the nesting tray 1412 of FIG. 14. The rolled lip extension 1512 of removable nesting tray 1412 of FIG. 14 sits on top of the base tray upper edge to allow a watertight seal with the extended cover 1410 of FIG. 14 of one embodiment.

Figure 16A:
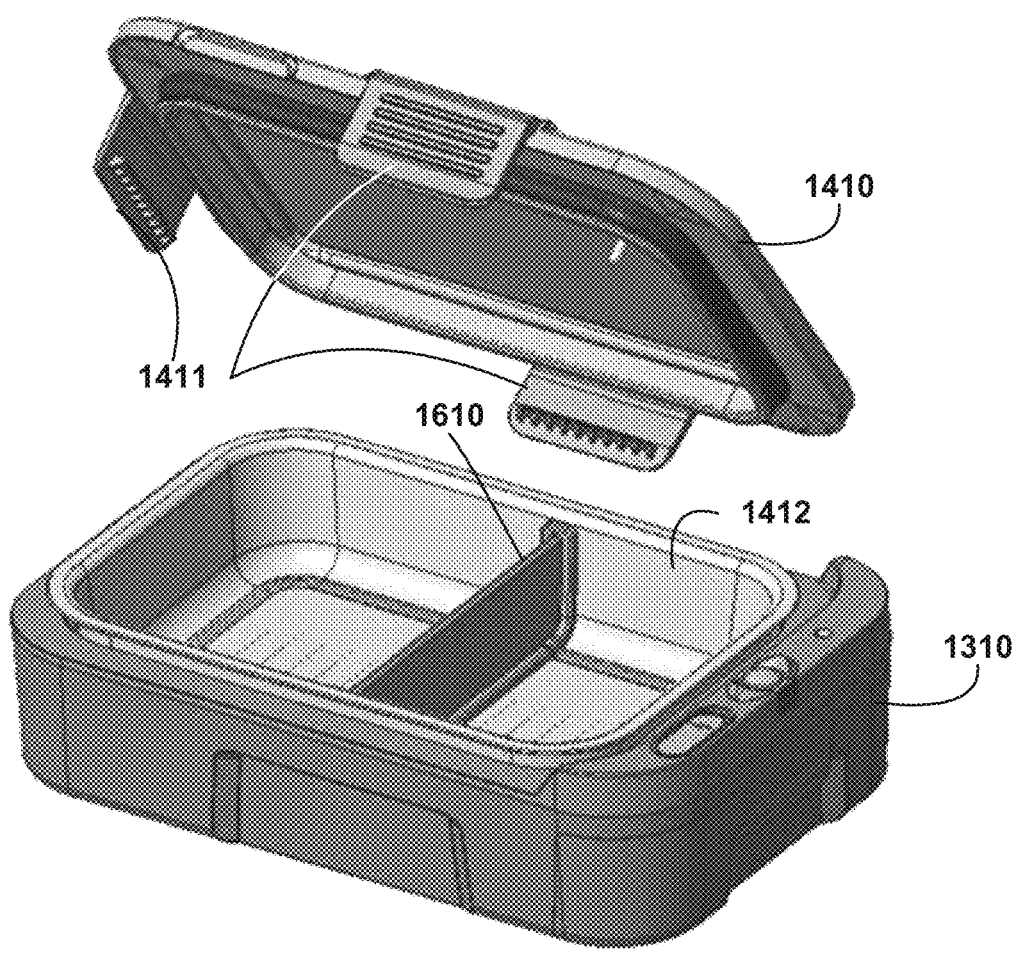
FIG. 16A shows for illustrative purposes only an example of an extended cover of one embodiment.

Extended Cover:

FIG. 16A shows for illustrative purposes only an example of an extended cover of one embodiment. FIG. 16A shows the extended cover 1410 in this embodiment with three extended latch 1411 components. The removable nesting tray 1412 is shown inserted into the food warming device base unit 1310. An adjustable silicone divider 1610 is shown placed in the removable nesting tray 1412. The adjustable silicone divider 1610 may be slipped into place anywhere along the length of removable nesting tray 1412 allowing separate compartments for different food ingredients of one embodiment.

Figure 16B:
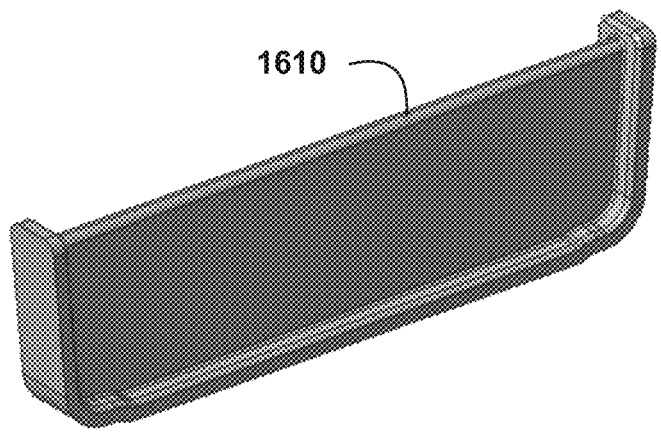
FIG. 16B shows for illustrative purposes only an example of an adjustable silicone divider of one embodiment.

Adjustable Silicone Divider:

FIG. 16B shows for illustrative purposes only an example of an adjustable silicone divider of one embodiment. FIG. 16B shows the adjustable silicone divider 1610 that includes side and bottom wider flanges than the center divider panel. The side and bottom wider flanges provide stability to the adjustable silicone divider 1610 to prevent movement while the different food ingredients are being heated. In instances where the food is stored in the removable nesting tray 1412 of FIG. 14 either before or after heating the adjustable silicone divider 1610 will maintain separation of the different food ingredients of one embodiment.

Figure 17:
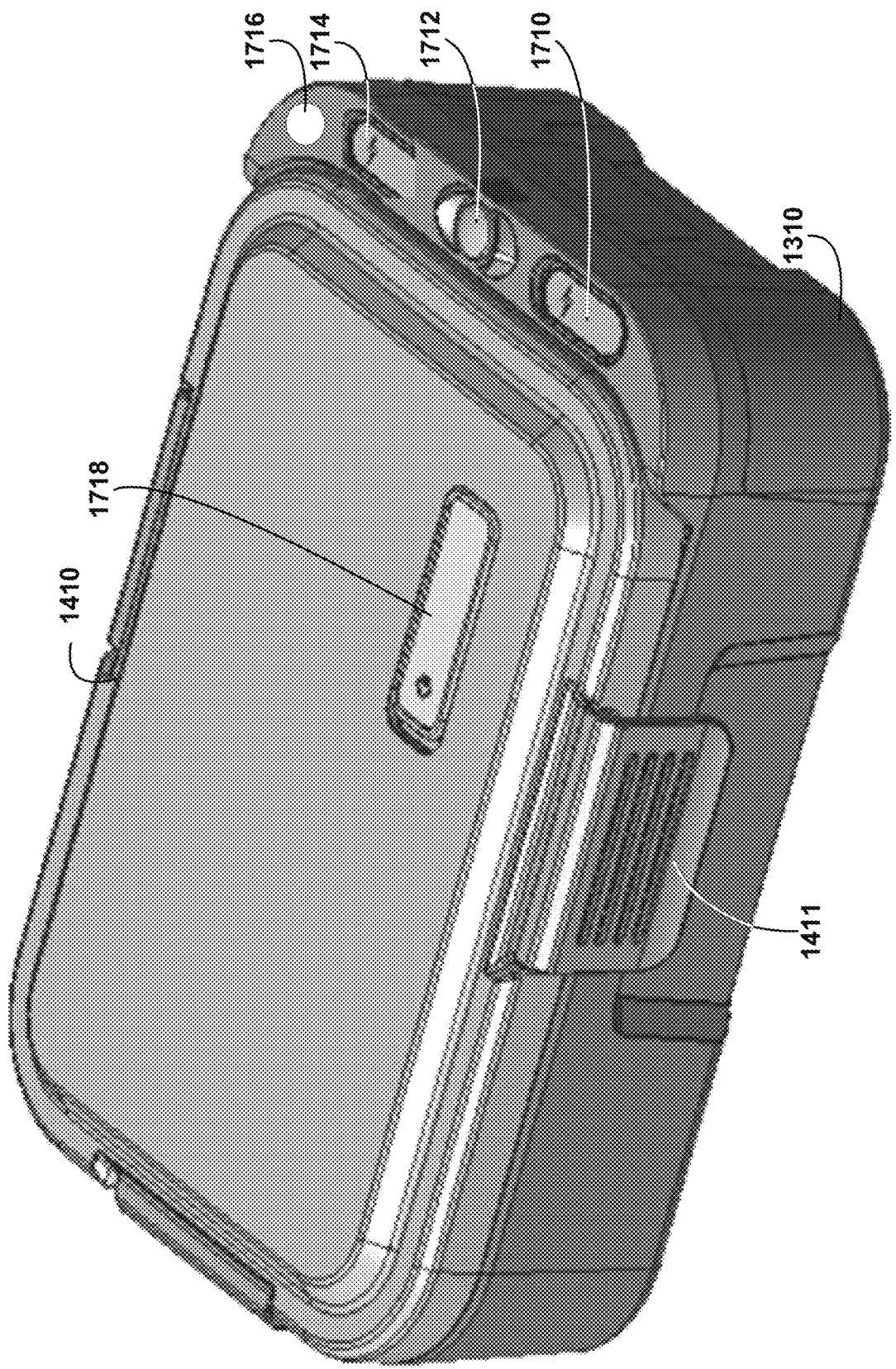
FIG. 17 shows for illustrative purposes only an example of a pressure relief valve of one embodiment.

Pressure Relief Valve:

FIG. 17 shows for illustrative purposes only an example of a pressure relief valve of one embodiment. FIG. 17 shows the food warming device base unit 1310 with the extended cover 1410 covering the food warming device base unit 1310. Showing are operating and control components including a pressure relief valve 1718, a power indicator 1716, an AC operation port 1714, a power button 1712, and an AC charging port 1710. The extended cover 1410 provides a watertight seal when closed with extended latches 1411. The pressure relief valve 1718 allows pressure equalization for vapor or high-altitude vacuum that can occur due to a watertight seal. The power Indicator 1716 illuminates when the device is in operation. An AC operation port 1712 allows AC operation of the device when used with an optional high-power AC adapter. The power button 1712 is used to turn the food warming device base unit 1310 on and off. The AC charge port 1710 is used with a standard low-power AC adapter to charge the battery on the device. The low-power AC adapter may also be used for charging the battery separately of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. An apparatus, comprising:
a removable food container tray configured to hold food items;
an integrated heat tray insert coupled to electrical components and configured for warming the food items placed in the removable food container tray, wherein the removable food container tray is further configured to be detached from the integrated heat tray insert to allow the food items to be served independently of a food warming device and to enable cleaning of the removable food container tray separate from the food warming device;
a food warming device base unit coupled to the food warming device and configured to be powered with a removable battery through an electrical connection to generate heat in a plurality of heat-dispersing elements;
wherein the integrated heat tray insert is coated with a non-stick surface;
wherein the plurality of heat-dispersing elements are coupled to the integrated heat tray insert and configured to generate heat in the integrated heat tray insert;
a control printed circuit board assembly coupled to the plurality of heat-dispersing elements and including digital devices configured for activating and controlling the integrated heat tray insert through the electrical components including the plurality of heat dispersing elements;
wherein the control printed circuit board assembly is configured to include at least one digital processor, at least one digital memory device, at least one database, at least one infrared thermometer coupled to the control printed circuit board assembly, at least one chemical vapor sensing device, at least one circuit coupled to a removable food container tray cover, at least one first circuit coupled to at least one digital temperature display, at least one second circuit coupled to an alert light coupled to the removable food container tray cover, and at least one third circuit coupled to a temperature control selection device mounted on a heat tray insert mounting ledge;
a temperature control device coupled to the control printed circuit board assembly configured to regulate heat temperatures generated from the plurality of heat-dispersing elements;
at least one removable rechargeable battery pack of the removable battery and located on a base located adjacent to an external side of the integrated heat tray insert and coupled to the control printed circuit board assembly configured to have high current and heat resistant capability, wherein the at least one removable rechargeable battery pack is configured to allow a user to quickly release and remove the at least one removable rechargeable battery pack from the base;
wherein the at least one removable rechargeable battery pack further includes an external charging port configured to charge the at least one removable rechargeable battery when the at least one removable rechargeable battery is removed from the removable food container tray by the user; and
wherein the at least one removable rechargeable battery pack is further configured to supply direct current power to the electrical components for powering the plurality of heat-dispersing elements to heat levels above 140° F.

2. The apparatus of claim 1, wherein the at least one removable rechargeable battery pack is coupled to the food warming device base unit and configured to clip on the food warming device base unit and power the food warming device base unit.

3. The apparatus of claim 1, wherein the integrated heat tray insert is removably coupled to the food warming device base unit and configured to hold the food items within the integrated heat tray insert to heat the food items using the plurality of the heat-dispersing elements of the food warming device base unit and having a rolled lip extension on the perimeter of a top opening to create a watertight seal with an extended cover.

4. An apparatus, comprising:
a removable food container tray configured to hold food items;
a food warming device including an integrated heat tray insert coupled to electrical components and configured to warm the food items placed in the removable food container tray;
wherein the removable food container is further configured to be detached from the integrated heat tray insert to allow the food items to be served independently of the food warming device and to enable cleaning of the removable food container tray separate from the food warming device;
a food warming device base unit coupled to the food warming device and configured to be powered with a removable battery through an electrical connection to generate heat in a plurality of heat-dispersing elements;
wherein the integrated heat tray insert is coated with a non-stick surface;
wherein the plurality of heat-dispersing elements are coupled to the electrical components and coupled to the integrated heat tray insert and configured to generate heat in the integrated heat tray insert;
a control printed circuit board assembly coupled to the plurality of heat-dispersing elements and including digital devices configured for activating and controlling the integrated heat tray insert through the electrical components including the plurality of heat dispersing elements;
wherein the control printed circuit board assembly is configured to include at least one digital processor, at least one digital memory device, at least one database;
at least one infrared thermometer coupled to the control printed circuit board assembly, at least one chemical vapor sensing device, at least one circuit coupled to a the removable food container tray cover, at least one first circuit coupled to at least one digital temperature display, at least one second circuit coupled to an alert light coupled to the removable food container tray cover, and at least one third circuit coupled to a temperature control selection device mounted on a heat tray insert mounting ledge;
a temperature control device coupled to the control printed circuit board assembly configured to regulate heat temperatures generated from the plurality of heat-dispersing elements;
at least one removable rechargeable battery pack of the removable battery and located on a base unit located adjacent to an external side of the integrated heat tray insert and coupled to the control printed circuit board assembly configured to have high current and heat resistant capability, wherein the at least one removable rechargeable battery pack is configured to allow a user to quickly release and remove the at least one removable rechargeable battery pack from the base;

a waterproof pressure valve integrated in a top portion of the removable food container tray cover and configured to manually release pressure within the removable food container tray;

an AC charger plug coupled to an AC power source configured to plug into an AC charging port for charging the at least one removable rechargeable battery pack on an exterior of the food warming device base unit;

wherein the at least one removable rechargeable battery pack further includes an external charging port configured to charge the at least one removable rechargeable battery when the at least one removable rechargeable battery is removed from the removable food container tray by the user;

wherein the plurality of heat dispersing elements coupled to the control printed circuit board assembly are used to warm the food items placed in the integrated heat tray insert; and wherein the at least one removable rechargeable battery pack is further configured to supply direct current power to the electrical components for powering the plurality of heat-dispersing elements to heat levels above 140° F.

5. A system, comprising:

a removable food container tray configured to hold food items;

a food warming device including an integrated heat tray insert coupled to electrical components and configured to warm the food items placed in the removable food container tray, wherein the removable food container tray is further configured to be detached from the integrated heat tray insert to allow the food items to be served independently of the food warming device and to enable cleaning of the removable food container tray separate from the food warming device;

a food warming device base unit coupled to the food warming device and configured to be powered with a removable battery through an electrical connection to generate heat in a plurality of heat-dispersing elements;

wherein the integrated heat tray insert is coated with a non-stick surface;

wherein the plurality of heat-dispersing elements are coupled to the integrated heat tray insert and configured to generate heat in the integrated heat tray insert;

a control printed circuit board assembly coupled to the plurality of heat-dispersing elements and including digital devices configured for activating and controlling the electrical components including the plurality of heat-dispersing elements;

wherein the control printed circuit board assembly is configured to include at least one digital processor, at least one digital memory device, at least one database;

at least one infrared thermometer coupled to the control printed circuit board assembly, at least one chemical vapor sensing device, at least one circuit coupled to a the removable food container tray cover, at least one first circuit coupled to at least one digital temperature display, at least one second circuit coupled to an alert light coupled to the removable food container tray cover, and at least one third circuit coupled to a temperature control selection device mounted on a heat tray insert mounting ledge;

a temperature control device coupled to the control printed circuit board assembly configured to regulate heat temperatures generated from the plurality of heat-dispersing elements;

at least one removable rechargeable battery pack of the removable battery and located on a base located adjacent to an external side of the integrated heat tray insert and coupled to the control printed circuit board assembly configured to have high current and heat resistant capability, wherein the at least one removable rechargeable battery pack is configured to allow a user to quickly release and remove the at least one removable rechargeable battery pack from the base;

a waterproof pressure valve integrated in a top portion of the removable food container tray cover configured to manually release pressure within the removable food container tray;

a food warming digital application installed on a digital device of the user configured to display food status alerts of the food items on a digital screen of the digital device and broadcasting audible status alerts of the food items;

an AC charger plug coupled to an AC power source configured to plug into an AC charging port for charging the at least one removable rechargeable battery pack on an exterior of the food warming device base unit;

wherein the at least one removable rechargeable battery pack further includes an external charging port configured to charge the at least one removable rechargeable battery when the at least one removable rechargeable battery is removed from the removable food container tray by the user;

wherein the plurality of heat-dispersing elements are coupled to the control printed circuit board assembly and are used to warm the food items placed in the integrated heat tray insert; and wherein the at least one removable rechargeable battery pack is further configured to supply direct current power to the electrical components for powering the plurality of heat-dispersing elements to heat levels above 140° F.

6. The system of claim 5, further comprising at least one adjustable silicone divider having side and bottom flanges wider than a center divider panel configured to provide stability to the adjustable silicone divider to prevent movement while the divider separates the food items being heated.

7. The system of claim 5, further comprising an AC operation port configured to connect the food warming device to an AC power source to power the operations of the food warming device.

8. The system of claim 5, wherein the at least one removable rechargeable battery pack is coupled to the food warming device base unit and is further configured to clip on the food warming device base unit and power the food warming device base unit.

9. The apparatus of claim 1, further comprising at least one digital temperature display configured to show a current temperature setting.

10. The apparatus of claim 4, further comprising at least one digital temperature display configured to show a current temperature setting.

11. The system of claim 5, further comprising at least one digital temperature display configured to show a current temperature setting.

12. The system of claim 5, wherein the food warming digital application is further configured to allow the user to set the desired temperature and turn off the food warming device.

* * * * *